United States Patent
Patel et al.

(10) Patent No.: US 10,178,424 B2
(45) Date of Patent: Jan. 8, 2019

(54) CONTENT DELIVERY SYSTEM AND METHOD FOR PROVIDING CUSTOMIZED CHANNELS AND CONTENT TO TERMINAL DEVICES

(71) Applicant: salesforce.com, inc., San Francisco, CA (US)

(72) Inventors: Rajan Patel, San Francisco, CA (US); Douglas Lowder, San Leandro, CA (US); Kapildev Reddy Gowru, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 0 days.

(21) Appl. No.: 15/442,827

(22) Filed: Feb. 27, 2017

(65) Prior Publication Data

US 2018/0249194 A1   Aug. 30, 2018

(51) Int. Cl.
| | |
|---|---|
| *H04N 21/2668* | (2011.01) |
| *H04N 21/254* | (2011.01) |
| *H04N 21/4627* | (2011.01) |
| *H04N 21/258* | (2011.01) |
| *H04N 21/45* | (2011.01) |
| *H04N 21/266* | (2011.01) |
| *H04N 21/84* | (2011.01) |
| *H04N 21/482* | (2011.01) |
| *H04N 21/438* | (2011.01) |
| *H04N 21/81* | (2011.01) |

(Continued)

(52) U.S. Cl.
CPC ..... *H04N 21/2668* (2013.01); *H04N 21/2541* (2013.01); *H04N 21/25891* (2013.01); *H04N 21/266* (2013.01); *H04N 21/4122* (2013.01); *H04N 21/4383* (2013.01); *H04N 21/4532* (2013.01); *H04N 21/4627* (2013.01); *H04N 21/4821* (2013.01); *H04N 21/8166* (2013.01); *H04N 21/84* (2013.01); *H04N 21/4788* (2013.01)

(58) Field of Classification Search
None
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |

(Continued)

*Primary Examiner* — Cai Y Chen
(74) *Attorney, Agent, or Firm* — Lorenz & Kopf, LLP

(57) ABSTRACT

A method of operating a content delivery system that includes a terminal device and a server includes storing, within the memory element, a channel configuration that has been customized for the terminal device. The method also includes authenticating the terminal device with the server and receiving, by the server, a request for the channel configuration from the terminal device. The method further includes sending, by the server to the terminal device, the channel configuration in response to the request for the channel configuration after authenticating the terminal device. Also, the method includes receiving, by the server, a request for content from the terminal device. The request for content corresponds to the channel configuration. Additionally, the method includes sending, by the server to the terminal device, a content element for populating a terminal device channel by the terminal device according to the channel configuration.

14 Claims, 10 Drawing Sheets

(51) Int. Cl.
*H04N 21/41* (2011.01)
*H04N 21/4788* (2011.01)

(56) References Cited

U.S. PATENT DOCUMENTS

| | | | |
|---|---|---|---|
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,774,926 B1 * | 8/2004 | Ellis ............... H04N 5/44543 348/14.01 |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,069,231 B1 | 6/2006 | Cinarkaya et al. |
| 7,181,758 B1 | 2/2007 | Chan |
| 7,289,976 B2 | 10/2007 | Kihneman et al. |
| 7,340,411 B2 | 3/2008 | Cook |
| 7,356,482 B2 | 4/2008 | Frankland et al. |
| 7,401,094 B1 | 7/2008 | Kesler |
| 7,412,455 B2 | 8/2008 | Dillon |
| 7,508,789 B2 | 3/2009 | Chan |
| 7,620,655 B2 | 11/2009 | Larsson et al. |
| 7,698,160 B2 | 4/2010 | Beaven et al. |
| 7,779,475 B2 | 8/2010 | Jakobson et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven |
| 8,095,594 B2 | 1/2012 | Beaven et al. |
| 8,209,308 B2 | 6/2012 | Rueben et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0021019 A1 | 1/2006 | Hinton et al. |
| 2006/0123455 A1 * | 6/2006 | Pai .................. H04N 7/17318 725/133 |
| 2008/0249972 A1 | 10/2008 | Dillon |
| 2009/0063414 A1 | 3/2009 | White et al. |
| 2009/0100342 A1 | 4/2009 | Jakobson |
| 2009/0177744 A1 | 7/2009 | Marlow et al. |
| 2011/0247051 A1 | 10/2011 | Bulumulla et al. |
| 2012/0042218 A1 | 2/2012 | Cinarkaya et al. |
| 2012/0218958 A1 | 8/2012 | Rangaiah |
| 2012/0233137 A1 | 9/2012 | Jakobson et al. |
| 2013/0212497 A1 | 8/2013 | Zelenko et al. |
| 2013/0218948 A1 | 8/2013 | Jakobson |

(56) References Cited

U.S. PATENT DOCUMENTS

| | | |
|---|---|---|
| 2013/0218949 A1 | 8/2013 | Jakobson |
| 2013/0218966 A1 | 8/2013 | Jakobson |
| 2013/0247216 A1 | 9/2013 | Cinarkaya et al. |

\* cited by examiner

CONTENT DELIVERY SYSTEM AND METHOD FOR PROVIDING CUSTOMIZED CHANNELS AND CONTENT TO TERMINAL DEVICES

TECHNICAL FIELD

The present disclosure generally relates to a content delivery system and, more particularly, relates to a content delivery system and a method for providing customized channels and content to a plurality of terminal devices within the system.

BACKGROUND

Conventional content delivery systems (e.g., television (TV) systems) often display programs, information, and/or other content sent from a broadcaster or other content provider. The TV may also output associated audio that is sent from the content provider. Multiple TVs may be connected within the TV system, and the TVs may output the same video and audio available from the content provider.

Conventional TV systems have various limitations. For example, the available content may be substantially uniform for any associated TV. In other words, the broadcast content is substantially the same for the TVs within the system. As such, the available content may be of little interest for some TV users.

Accordingly, it is desirable to have an improved TV system and methodology for providing customized channels and/or customized content for TVs within the system. Improved systems, methodologies, and other desirable features and characteristics will become apparent from the subsequent detailed description and the appended claims, taken in conjunction with the accompanying drawings and the foregoing technical field and background.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

Figure 1:
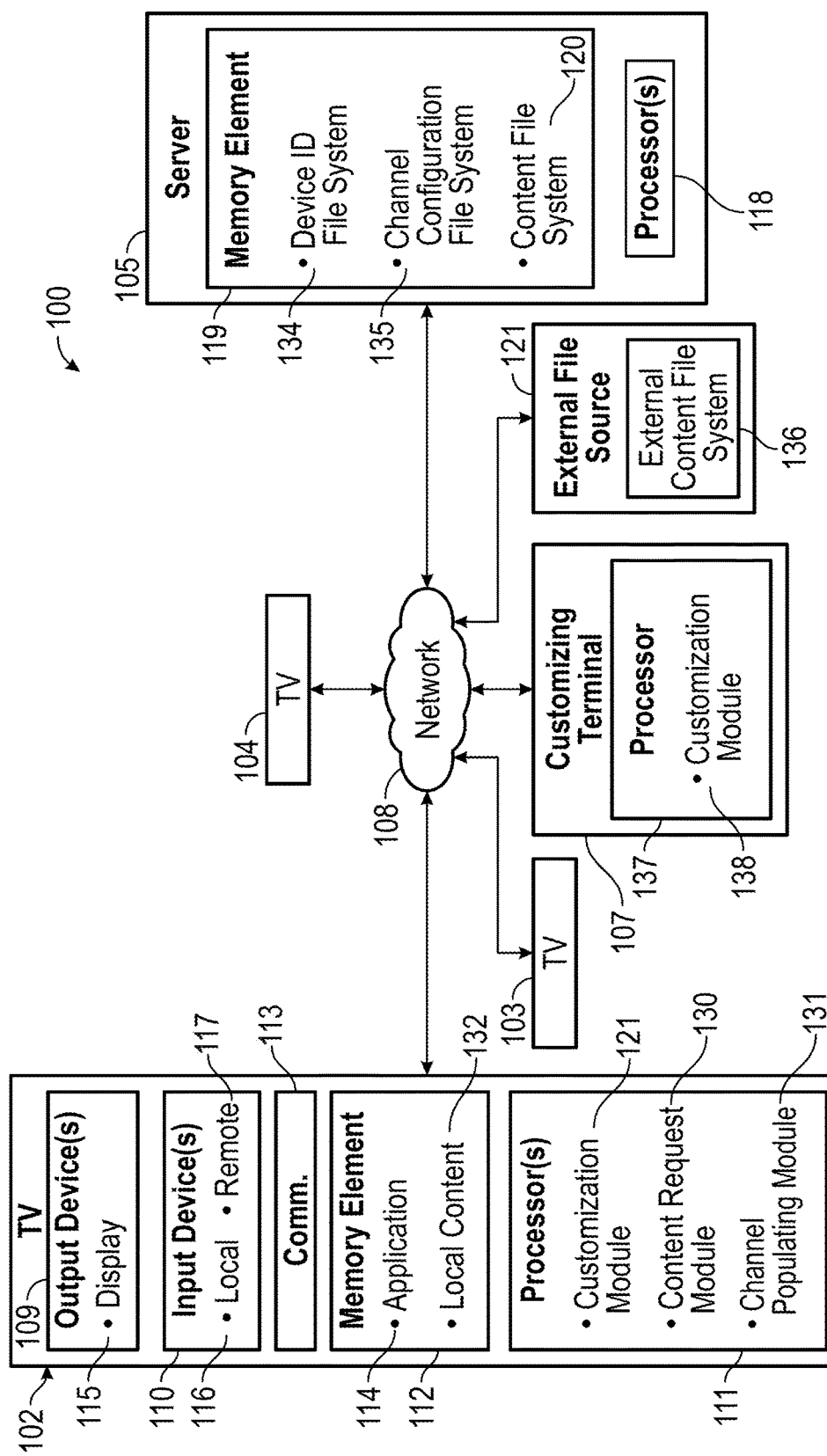
FIG. 1 is a simplified schematic representation of an exemplary content delivery system according to the present disclosure.

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

As used herein, the term "module" refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

As used herein, a computer-based "file" is defined in a manner that is consistent with ordinary usage in the computer field. In this regard, the definition provided by The Wikipedia Foundation is applicable: "a computer file is a resource for storing information, which is available to a computer program and is usually based on some kind of durable storage." Thus, a file of the system of the present disclosure can have any commonly used file extension for text documents, images, videos, spreadsheets, notes, etc. (such as .docx, .pdf, .xlsx, .txt, .jpg, .tiff, just to name a few). Moreover, a file can be a hyperlink, a folder or subfolder, a container file, an executable, an icon, or the like. These particular examples are not intended to be limiting or exhaustive in any way. It should be appreciated that any type of file can be managed by the system of the present disclosure as long as the file type is compatible with the database system and the related file system.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the television system described herein is merely one exemplary embodiment of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure When implemented in software or firmware, various elements of the systems described herein can be realized using code segments or instructions that perform the various tasks. In certain embodiments, the program or code segments are stored in a tangible processor-readable medium, which may include any medium that can store or transfer information. Examples of a non-transitory and processor-readable medium include an electronic circuit, a semiconductor memory device, a ROM, a flash memory, an erasable ROM (EROM), a floppy diskette, a CD-ROM, an optical disk, a hard disk, or the like.

Embodiments of the subject matter described herein generally relate to methods and systems for operating a content delivery system (e.g., a television (TV) system) wherein information is exchanged between a server and one or more terminal devices (e.g., one or more TVs). At least one terminal device of the system may be a smart TV in that it includes a respective processor and a respective operating system. The TV may store and run a native application for operating the TV, populating TV channels with predetermined content, communicating with the server, and more. The server has access to a large amount of stored content. The TV may communicate with the server to obtain certain user-specified content. Accordingly, the content provided by the server may be customized for display on the TV. Additionally, the system allows the customized content to be arranged, separated, and parsed between particular channels of the TV. Thus, the channels and the content displayed on each channel may be configured and customized for the particular TV as well. Accordingly, the system may provide tailored content that is arranged among a customized set of channels for the TV. Despite the large amount of available content, the system streamlines communications between the TV and the server so that the content may be delivered and output to the TV in a timely manner. Additionally, the system allows the user to easily and conveniently update the content and customize the TV viewing experience.

It should be noted that although one or more embodiments may be described herein in the context of a native application running on a local operating system of a smart TV, the subject matter is not necessarily limited as such. In practice, the present disclosure may be implemented in an equivalent manner in any number of different application systems, on-demand systems, cloud computing systems, and the like. Instead of a smart TV, at least one terminal device of the present disclosure may be embodied in the context of a computer display, smart phone, tablet, projector system, audio device, or other system for outputting saved content available and deliverable from a server. The present disclosure may also be implemented by any type of document, computer file or other resource that includes, presents, or otherwise displays a graphical user interface (GUI) display associated with a user interface capable of receiving input pertaining to the GUI display.

FIG. 1 is a simplified schematic representation that illustrates a content delivery system 100, which includes a plurality of terminal devices. In some embodiments, one or more of the terminal devices may be televisions (TVs), such as a first TV 102, a second TV 103, and a third TV 104. It will be appreciated that, although only three TVs 102, 103, 104 are shown in FIG. 1, the system 100 may include any number of televisions. The system 100 may also include a server 105 that is communicatively coupled to the TVs 102, 103, 104.

Although not always required, the illustrated embodiment of the system 100 also includes an external file source 121, which is communicatively coupled to the server 105. Furthermore, although it is not always required, the illustrated embodiment of the system 100 additionally includes an external customizing terminal 107, which is communicatively coupled to the server 105. The TVs 102, 103, 104, the server 105, the external file source 121, and the external customizing terminal 107 communicate with one another via a suitably configured data communication network 108.

FIG. 1 depicts a number of components of the first TV 102. It will be appreciated that the second TV 103 and/or third TV 104 may include similar features and functions.

The TV 102 may be implemented as a computer-based hardware component in the form of a smart TV. In this regard, the TV 102 generally includes, without limitation: one or more output devices 109, one or more input devices 110, at least one processor 111, at least one memory element 112, and a communications device 113.

The output device(s) 109 of the TV 102 may be configured for outputting content. The output devices 109 may include a display 115, such as a screen, monitor, reflective surface on which an image is projected, and the like. Although not shown, the output device(s) 109 may also include a speaker or other conventional output device for outputting content. It will be appreciated that multiple output devices 109 may operate simultaneously, for example, to deliver both audible and visual content to the users of the TV 102.

Figure 5A:
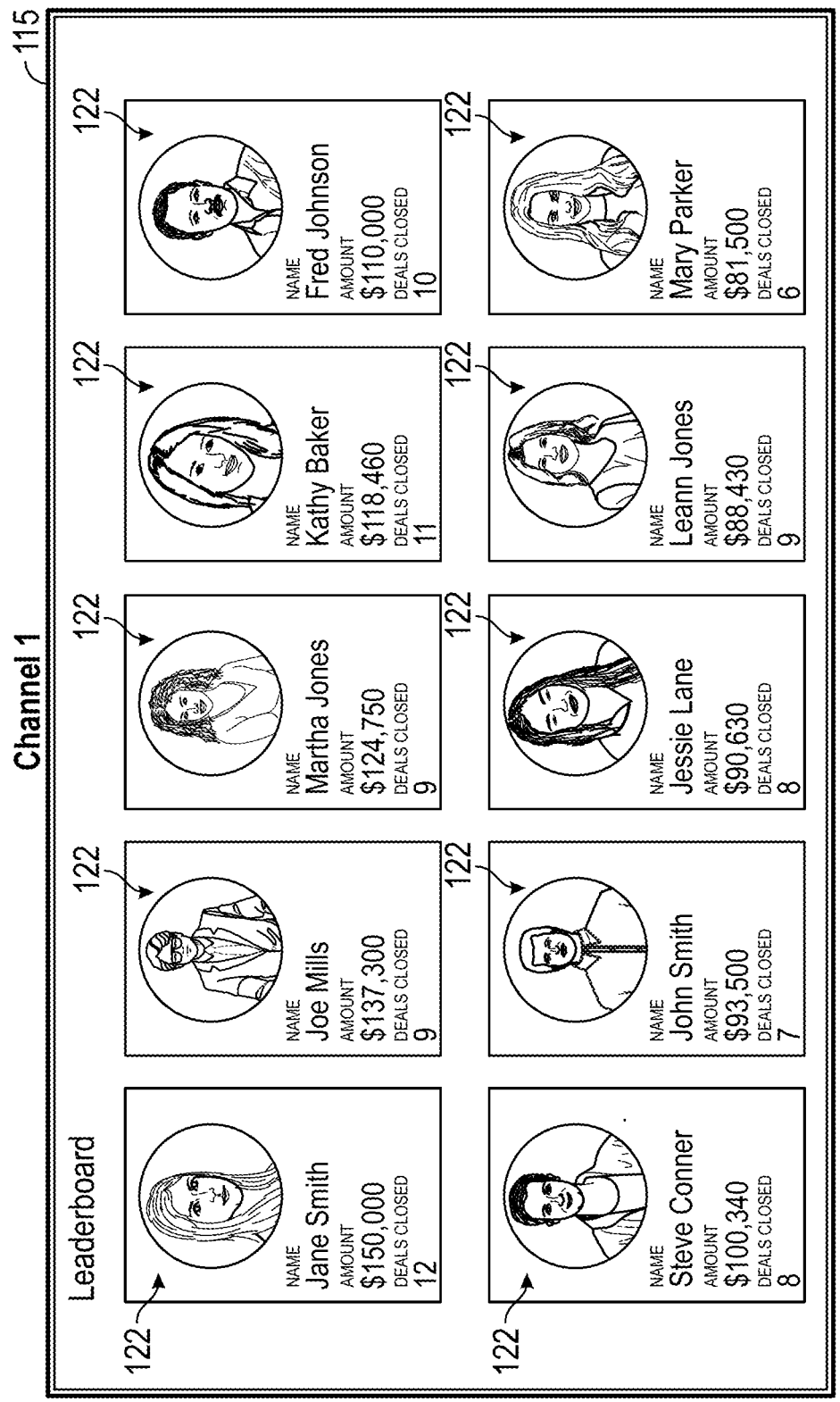
FIG. 5A is an exemplary embodiment of a first channel for a terminal device within the system of FIG. 1.
Figure 5B:
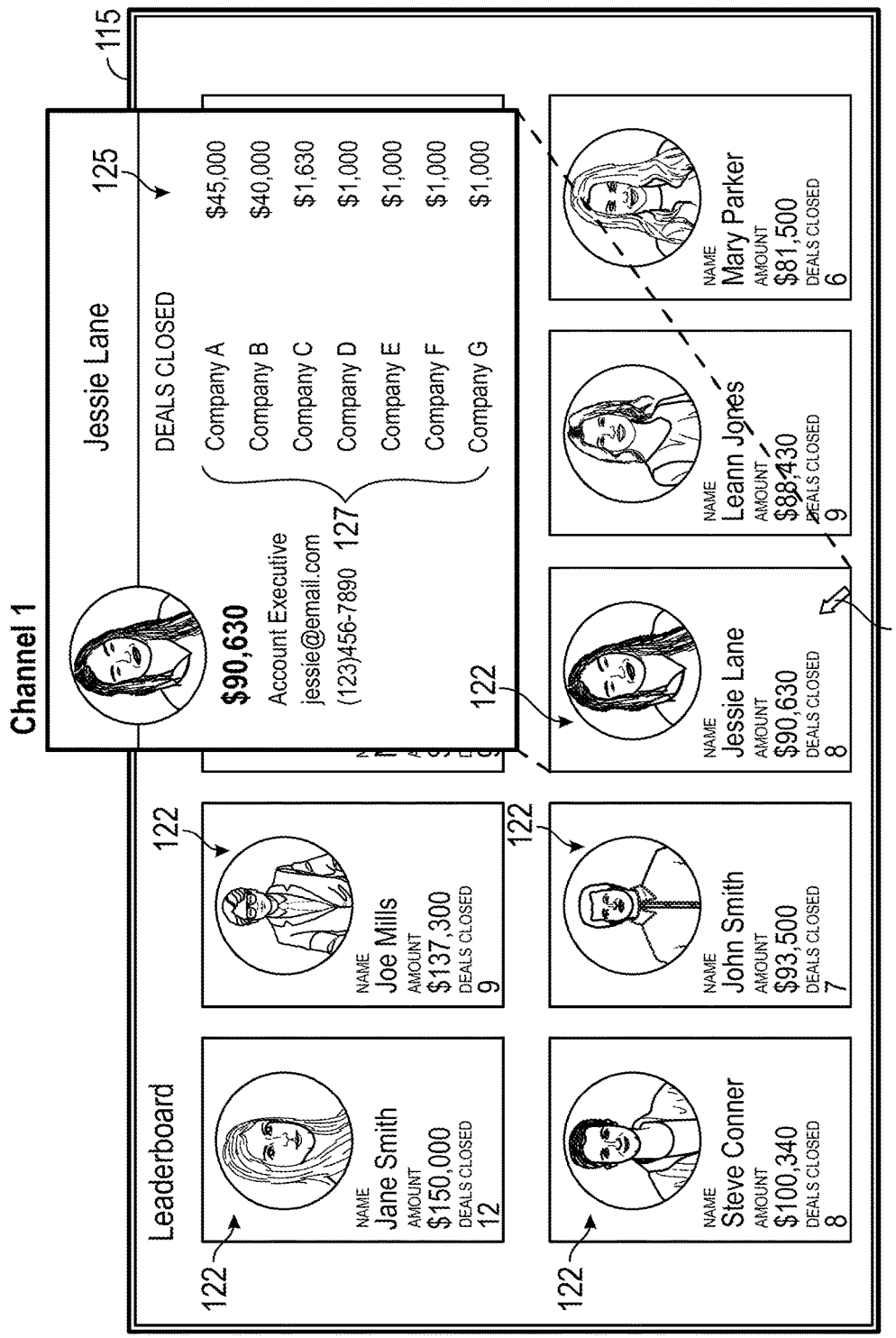
FIG. 5B is an exemplary embodiment of the first channel of FIG. 5B wherein user-selected content is displayed.
Figure 6:
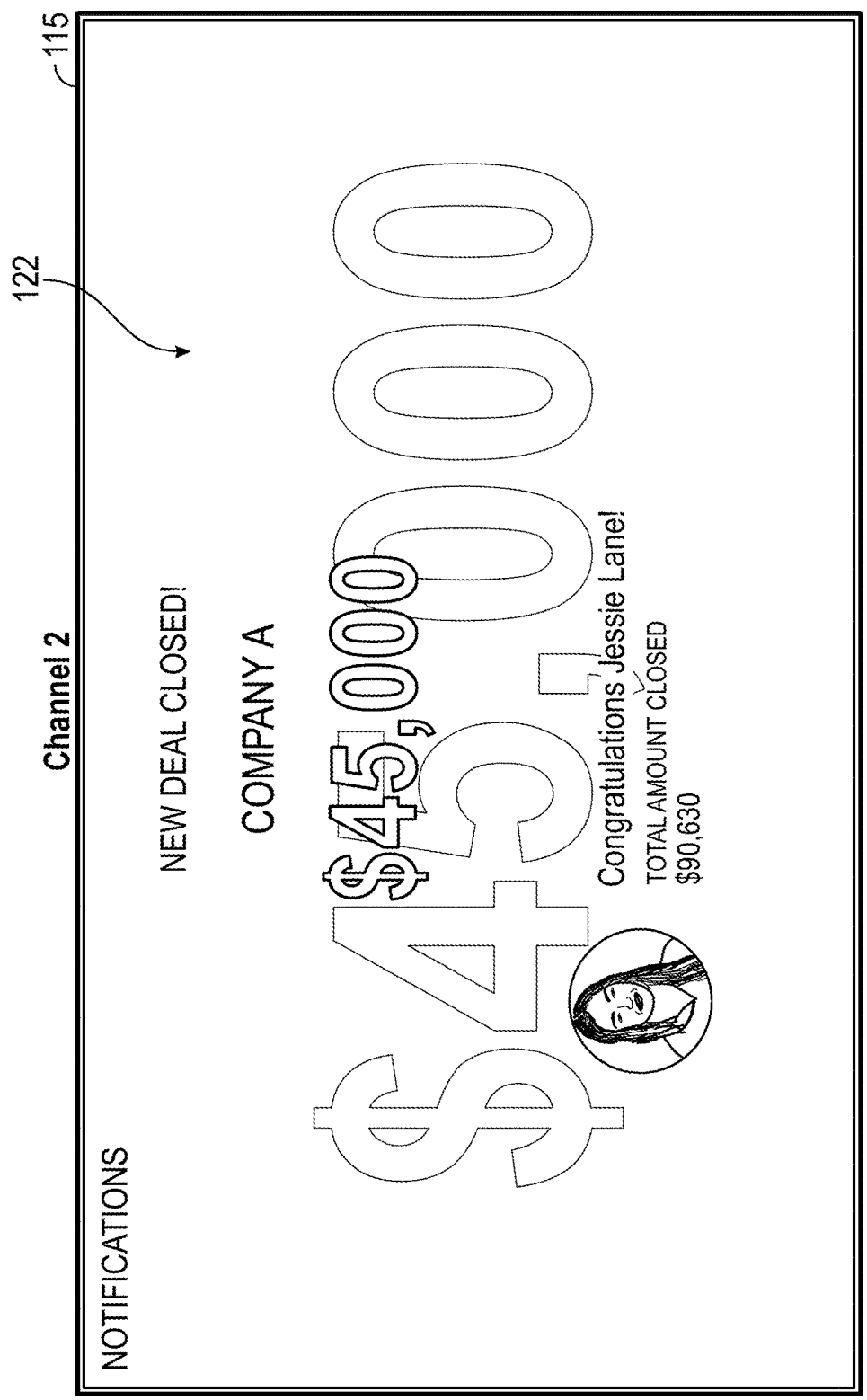
FIG. 6 is an exemplary embodiment of a second channel for the terminal device within the system of FIG. 1.

In some embodiments, the display 115 may selectively display two or more different channels. The different channels may display different content. FIGS. 5A, 5B, and 6 depict exemplary output display channels that provide various content as will discussed in greater detail below. As will be discussed, the display 115 may be configured to display content according to a channel configuration. The channel configuration for the first TV 102 may dictate which channels are available for display on the display 115 of the first TV 102. This channel configuration may also dictate what content elements are included on the particular channels. The channel configuration for the TV 102 may also dictate other characteristics of the content elements, such as without limitation: fonts, colors, background art, etc. The channel configuration may be customized for the first TV 102. In other words, the channel configuration for the first TV 102 may be different from the channel configuration of the second TV 103 and/or the channel configuration of the third TV 104. Thus, customized channels and content may be provided to the users of the TVs 102, 103, 104.

Referring back to FIG. 1, the input device(s) 110 of the system 100 will now be discussed. The input device(s) 110 may be used for inputting user-commands. More specifically, the input device(s) 110 may include without limitation: a button, a dial, a slider switch, a keypad, a touch-sensitive surface (e.g., of a touchscreen or touchpad device), a microphone, a mouse or other pointing device, a keyboard, a joystick, or any conventional device for inputting a control command from a user.

In some embodiments, the user may change the current channel using the input device 110, for example, by pressing either a channel UP or channel DOWN button. The input device(s) may be configured for the user to control (i.e., change) the volume setting, brightness or other picture setting, or other setting of the TV 102. The input device 110 may also be used to select or otherwise interact with the content displayed on the TV 102 as will be discussed.

Furthermore, in some embodiments, the input devices 110 may include a local control device 116 and a remote control device 117. The local control device 116 may be mounted to the TV 102 (i.e., supported by the same frame and/or housing that supports the display element of the TV 102). In contrast, the remote control device 117 may be movable and portable relative to the TV 102. In some embodiments, the remote control device 117 (i.e., remote control) may be a handheld device that is in wireless communication with the TV 102.

The processor 111 of the TV 102 may be, for example, a central processing unit (CPU), a graphical processing unit (GPU), a field programmable gate array (FPGA), a microcontroller, an application specific integrated circuit (ASIC), or any other logic device or combination thereof. The processor 111 of the TV 102 executes non-transitory computer-executable instructions stored in the memory element 112. Execution of the instructions may cause the TV 102 to perform various operations.

For example, the processor 111 may include a customization module 129 configured to execute instructions that support a channel customization technique. The channel customization technique may be used for selecting which channels are available on the TV 102. The channel customization technique may also be used for customizing what content is to appear on those selected channels. Moreover, the channel customization technique may be used for selecting how the content is arranged, displayed, and/or otherwise output by the output devices 109.

The processor 111 may further include a content request module 130 configured to execute instructions that support a content request technique. The content request module 130 may follow instructions for requesting particular content from the server 105 as will be described in detail below.

Moreover, the processor 111 may include a channel populating module 131 configured to execute instructions that support a channel populating technique. The channel populating module 131 may follow instructions for populating select channels of the TV 102 with predetermined content as will be described in detail below.

The memory element 112 of the system 100 can be implemented with any combination of volatile and non-volatile memory. The memory element 112 may include non-transitory computer-executable instructions stored thereon, wherein the instructions are configurable to be executed by the processor 111 as needed. The memory element 112 may store thereon any type of software, data, or other information.

As shown in FIG. 1, the memory element 112 may store an application 114 thereon. The application 114 may be a native application in some embodiments. As such, the application 114 may be a computer software application developed specifically for use on the operating system of the TV 102. Additionally, as will be discussed, the application 114 may be configured to provide instructions for communicating with the server 104 via the communications device 113.

The memory element 112 may further include stored local content 132. The local content 132 may store content for display on the display 115.

The communication device 113 of the system 100 may provide a communications link to the server 105 via the network 108. The communication device 113 may provide a wireless and/or wired communication to the network 108. Also, the communication device 113 of the TV may communicate with the network 108 via a router or other device. The communication device 113 may be configured according to one or more standard communications protocols.

The server 105 of the system 100 may be implemented using computer hardware. In this regard, the server 105 includes at least one processor 118 and at least one memory element 119 that is communicatively coupled to the processor 118.

The processor 118 may be, for example, a central processing unit (CPU), a graphical processing unit (GPU), a field programmable gate array (FPGA), a microcontroller, an application specific integrated circuit (ASIC), or any other logic device or combination thereof. As discussed in further detail below, the processor 118 of the server 105 executes non-transitory computer-executable instructions stored in the memory element 119, wherein execution of the instructions cause the server 105 to perform the various operations that support the channel populating technique.

The memory element 119 can be implemented with any combination of volatile and non-volatile memory. The memory element 119 has non-transitory computer-executable instructions stored thereon, wherein the instructions are configurable to be executed by the processor 118 as needed.

The memory element 119 may include a content file system 120. The content file system 120 may store the content that is available to the TVs 102, 103, 104. In some embodiments, the content may be parsed into distinct content elements, which are saved separately in the content file system 120. An example content element may be a set of alphanumeric data, a chart, a graph, a video clip, an audio file, an executable computer program, or other element. The content file system 120 may store the content elements in any arrangement. For example, different content elements may be arranged in different files, folders, directories, or other distinct storage locations within the content file system 120. In some embodiments, the filing location of one content element may be associated with the filing location of another content element or content sub-element.

The memory element 119 may also include a device ID file system 134. The device ID file system 134 may store unique identifiers (e.g., uniqueids) for each of the TVs 102, 103, 104. This information may be used for individually authenticating the TVs 102, 103, 104 with the server 105.

Additionally, the memory element 119 may include a channel configuration file system 135. The channel configuration file system 135 may store the customized channel configurations for the individual TVs 102, 103, 104. As mentioned above, the customized channel configurations may dictate what channels are available to the TVs 102, 103, 104 and the content elements 122 and sub-elements 127 for those channels.

It will be appreciated that the memory element 119 may be considered a centralized memory element 119 of the system 100. Thus, stored data within the memory element 119 may be conveniently accessed and updated at the server 105. Then, as will be discussed, up-to-date content will be accessible by any of the TVs 102, 103, 104. Accordingly, the centralized data may provide convenience and accuracy for the system 100.

Although the TV 102 and the server 105 are illustrated as having local memory elements 112, 119, the TV system 102 and the server 105 can also be configured to communicate with at least one external file source 121, which can be realized as a remote storage or memory element having at least one corresponding file system associated therewith. For example, the external file source 121 can be implemented as a cloud storage system or any other memory system maintained by a third party service or maintained by the same entity that maintains the system 100. The external file source 121 may include an external content file system 136 that includes a plurality of the content elements discussed above. In some embodiments, the external file source 121 may include content available from social media websites, such as twitter.com, facebook.com, etc. Content contained in the external file source 121 can be accessed through the network 108, which may include (without limitation) a wired network, a wireless network (e.g., WiFi, Bluetooth, Zigbee or the like), a cellular network, a satellite network or any other communication network or combination thereof. Further, while the instructions for carrying out the channel customization methodologies, content request methodologies, and channel populating methodologies as being stored locally at the TVs 102, 103, 104 and the server 105, those instructions could also reside in one or more external file sources 121 if so desired.

The external customizing terminal 107 generally represents an electronic device coupled to the network 108 that may be utilized to communicate with the server 105 to customize channels and channel content for the TVs 102, 103, 104. The external customizing terminal 107 may be a personal computer, mobile telephone, tablet, wearable device, or other network-enabled electronic device that includes a display device, such as a monitor, screen, or another conventional electronic display, capable of graphically presenting data and/or information. The external customizing terminal 107 may include a processor 137 with a customization module 138. The customization module 138 may be similar to the customization module 129 of the TV 102 discussed above. The external customizing terminal 107 may also include a user input device, such as a touchscreen, a touch panel, a mouse, a joystick, a directional pad, a motion sensor, or the like, capable of receiving gestural input from the user. A user may use the customizing terminal 107 to communicate with the server 105 using a networking protocol, such as the hypertext transport protocol (HTTP) or the like, to access or otherwise customize stored information for one of the TVs 102, 103, 104 as will be discussed. In certain exemplary embodiments, the customizing terminal 107 may utilize a web browser application.

Figure 2A:
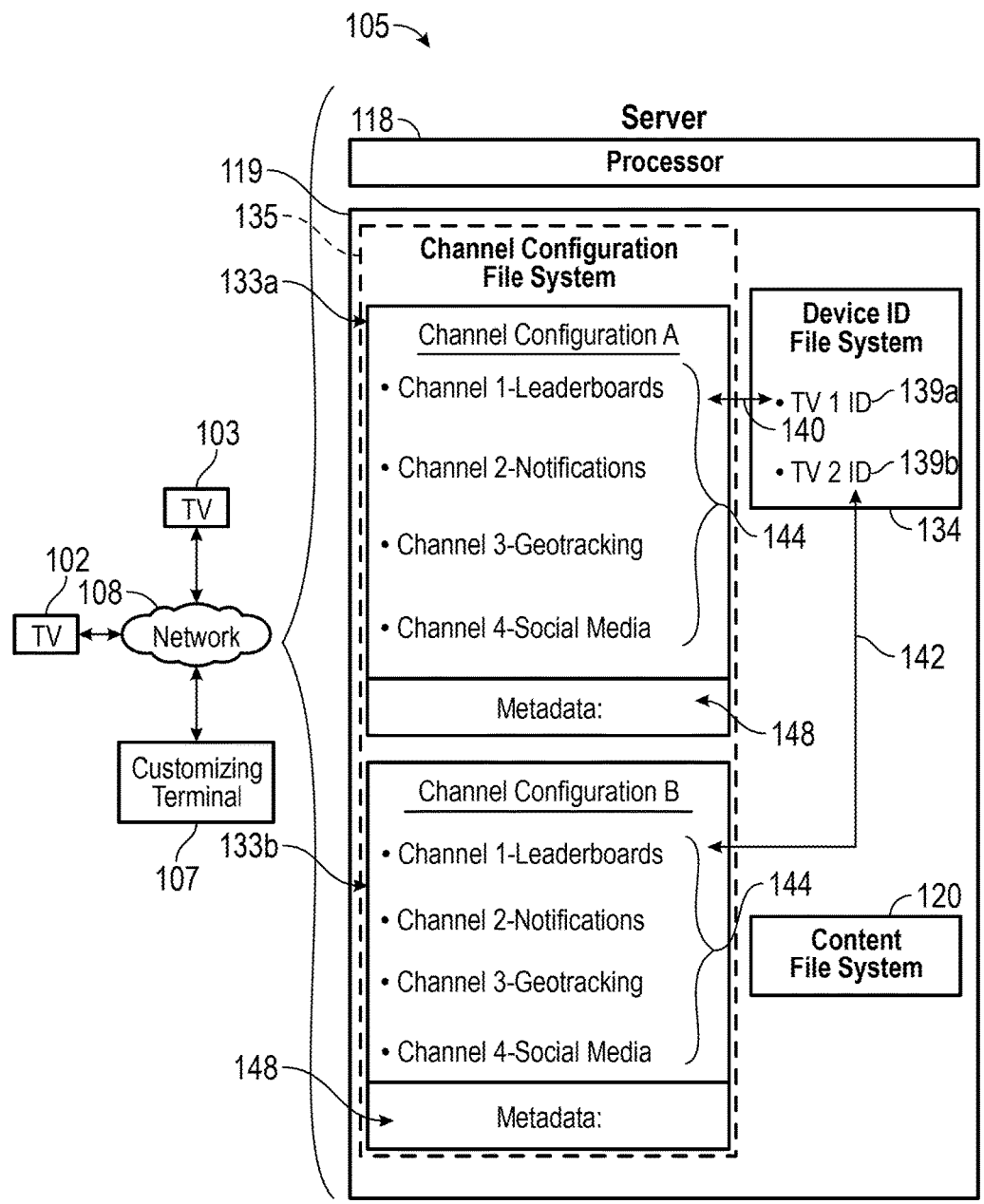
FIGS. 2A-2C are simplified schematic representations of the content delivery system of FIG. 1 representing customization of channel configurations for terminal devices within the system.
Figure 2B:
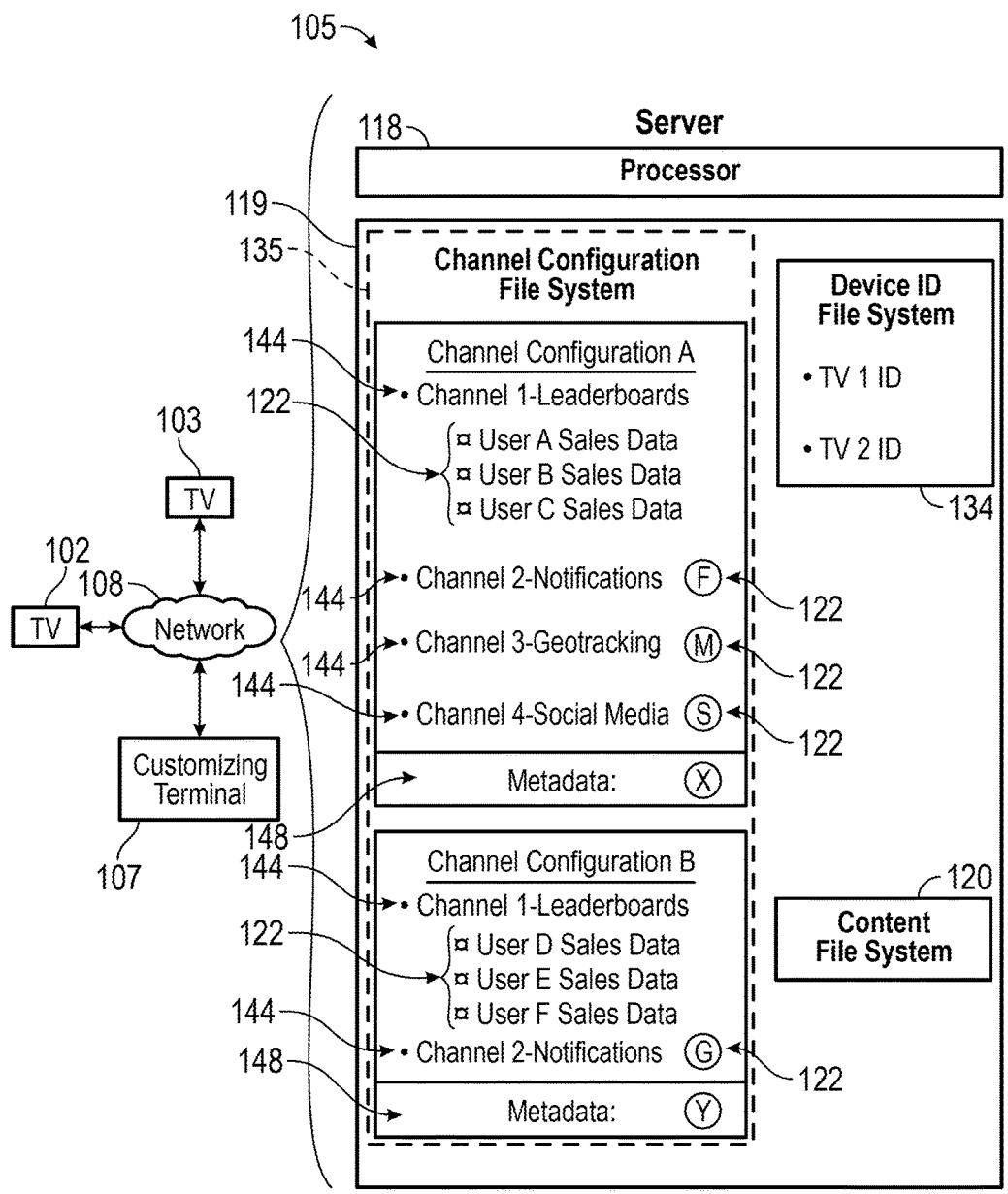
Figure 2C:
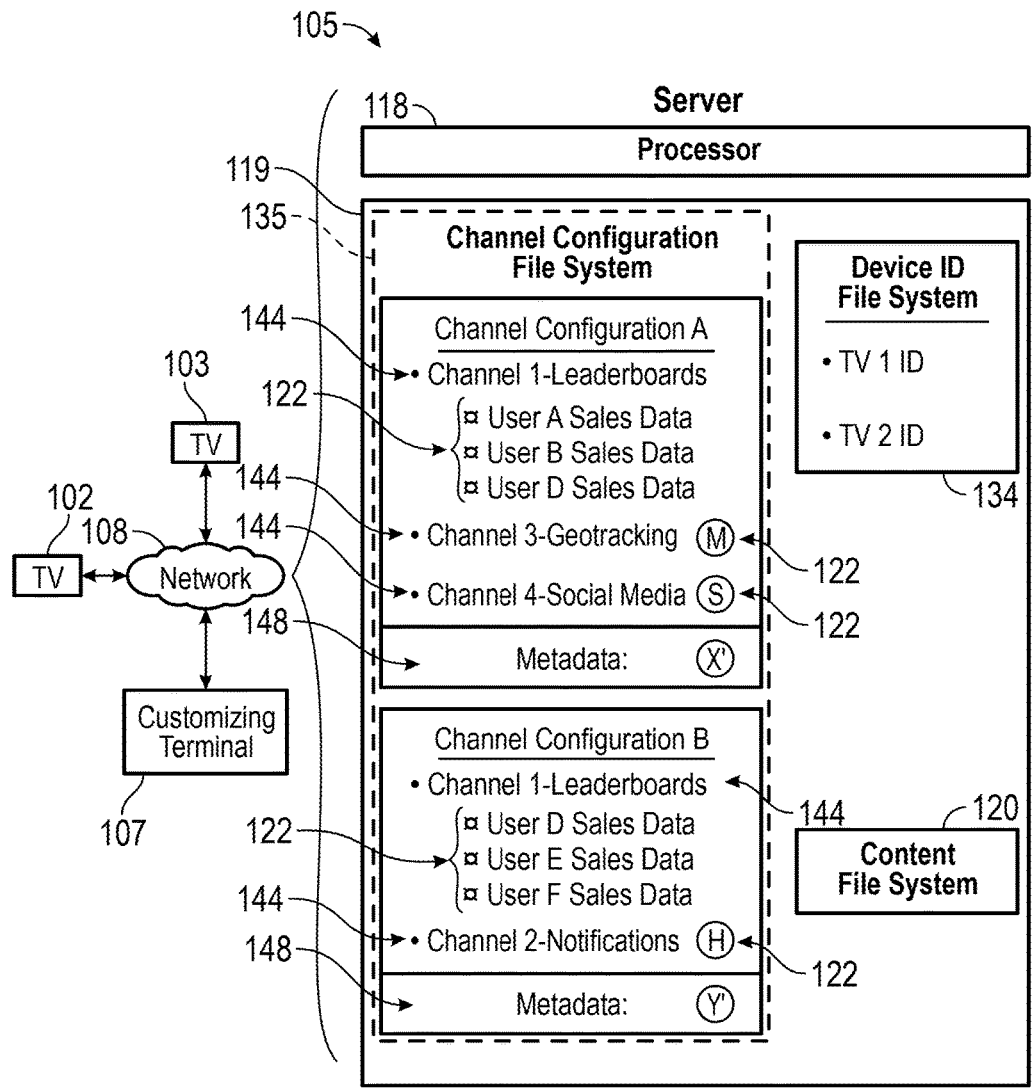

Referring now to FIGS. 2A-2C, additional details of the server 105 will be discussed. The first TV 102, the second TV 103, the customizing terminal 107, and the network 108 are also shown in FIGS. 2A-2C. Although other components from FIG. 1 are omitted in FIGS. 2A-2C, it will be appreciated that they may also be included.

FIGS. 2A, 2B, and 2C illustrate the channel configuration file system 135 as having a first channel configuration 133a and a second channel configuration 133b. As mentioned above, the channel configurations 133a, 133b may dictate what channels are available on a particular TV, and what content elements 122 are included on each of those specified channels. Again, the different content elements 122 may be different files containing different alphanumeric data, charts, graphs, video clips, audio files, and the like.

For purposes of discussion, it will be assumed that the first channel configuration 133a is associated with the first TV 102 and that the second channel configuration 133b is associated with the second TV 103. Accordingly, the device ID file system 134 of the server 105 may include a stored first identifier 139a (e.g., a unique identifier of the first TV 102) and a stored second identifier 139 (e.g., a unique identifier of the second TV 103). The first identifier 139a may be associated with the first channel configuration 133a as indicated by the double-headed arrow 140 in FIG. 2A, and the second identifier 139b may be associated with the second channel configuration 133b as indicated by the double-headed arrow 142.

FIG. 2A may represent a template that is presented to users for building a customized channel configuration 133a for the first TV 102 and a customized channel configuration 133b for the second TV 103. FIG. 2B shows that the channel configurations 133a, 133b have been customized.

Using the first channel configuration 133a as an example, the channel configuration 133a may generally include channel data 144. The channel data 144 may include a listing of channels that are available on the first TV 102. In FIGS. 2A and 2B, Channel 1, Channel 2, Channel 3, and Channel 4 are available. In the illustrated embodiment, Channel 1 is a "Leaderboards" Channel (e.g., similar to the embodiment shown in FIGS. 5A and 5B). Accordingly, sales data of different salespeople may be displayed for comparison on Channel 1. Also, Channel 2 is a "Notifications" Channel, (e.g., similar to the embodiment shown in FIG. 6). Accordingly, Channel 2 may show notifications that are broadcast to multiple TVs or direct messages sent to individual TVs 102, 103, 104. Furthermore, Channel 3 may be a "Geotracking" Channel that displays the geo-location of different salespeople and associated data as well. Additionally, Channel 4 may be a "Social Media" Channel, which allows users at different TVs 102, 103, 104 to interact with each other socially.

As shown in FIG. 2A, the template for the second channel configuration 133b may include the same channel data 144 as the first channel configuration 133a. In other embodiments, the template for the second channel configuration 133b may be different from the template for the first channel configuration 133a.

As shown in FIG. 2B, the individual channels in the channel configurations 133a, 133b may be customized. Specifically, the user may assign specific content elements 122 to each of the listed channels. Specifically, in FIG. 2B, "User A Sales Data," "User B Sales Data," and "User C Sales Data" are the content elements 122 that are included in the Channel 1 channel data 144 for the first channel configuration 133a. In some embodiments, the "User A Sales Data," "User B Sales Data," and "User C Sales Data" content elements 122 may be stored in separate files on either the content file system 120 or the external external content file system 136. Also, a notifications dataset F is set to be shown on Channel 2. Furthermore, a geotracking dataset M is chosen for Channel 3. Finally, a social media dataset S is displayed on Channel 4.

Additionally, the first channel configuration 133a may include a collection of metadata 148. The metadata 148 is indicated in FIG. 2B as metadata set X. The metadata 148 may identify the storage location for the content elements 122 listed within the first channel configuration 133a. For example, the metadata 148 may identify folders, sub-folders, file paths, etc. within the content file system 120 where the selected content elements 122 are located. If some of the content elements 122 are stored within the external file source 121, then the metadata 148 may locate those content elements 122 as well.

Also, in some embodiments, the metadata 148 may include customized instructions regarding the appearance of the content elements 122. For example, the metadata 148 may indicate the layout of the different content elements 122 on the display 115, color schemes, fonts, and other characteristics of the content elements 122.

As shown in FIG. 2B, the second channel configuration 133b for the second TV 103 may be customized as well. In comparison with the template of FIG. 2A, only Channel 1 and Channel 2 remain (i.e., Channel 3 and Channel 4 have been deleted). Moreover, the content elements 122 for Channel 1 include "User D Sales Data," "User E Sales Data," and "User F Sales Data." Additionally, Channel 2 has been updated to include the Notifications dataset G. The metadata 148 of the second channel configuration 133*b* includes metadata set Y. Accordingly, it will be appreciated that the content and metadata included on the second channel configuration 133*b* may be different from those included on the first channel configuration 133*a*.

As represented in FIG. 2C, the first channel configuration 133*a* may be further updated and further customized. For example, Channel 1 has been updated so that "User D Sales Data" is included and "User C Sales Data" has been deleted. Also, as shown Channel 2 has been deleted from the first channel configuration 133*a*. As a result of these changes, the metadata 148 has been updated to metadata set X'.

Likewise, as shown in FIG. 2C, the second channel configuration 133*b* may be updated. As shown, Channel 2 has been changed so that it shows Notifications dataset H instead of the Notifications dataset G. As a result, the metadata 148 has been updated to metadata set Y'.

In some embodiments, the first channel configuration 133*a* may be accessed and modified using the first TV 102. For example, the first TV 102 may present a Graphic User Interface (GUI) that allows the user to modify the first channel configuration 133*a*. Also, the customization module 129 of the first TV 102 may be used to process user commands, communicate with the server 105, and customize the first channel configuration 133*a*. It will be appreciated that the second channel configuration 133*b* may also be accessed and modified using the second TV 103. A similar GUI may be presented on the second TV 103 for customizing the second channel configuration 133*b*.

Also, in some embodiments, the first and second channel configurations 133*a*, 133*b* may be accessed and modified using the customization terminal 107. For example, the customization terminal 107 may present a Graphic User Interface (GUI) that allows the user to modify the first and second channel configurations 133*a*, 133*b*.

Referring now to FIGS. 5A, 5B, and 6, example channels and content elements 122 displayed on those channels will be discussed in detail. As shown, the content may include alphanumeric symbols, graphical representations, pictures, audio files, textual information, etc. In the illustrated embodiments, the content largely includes sales data. As shown in FIG. 5A, for example, there may be content representing sales data for a number of different salespeople. In this case, the users of the TV 102 may be those salespeople that are identified ("Jane Smith," "Joe Mills," "Martha Jones," et al.).

The collection of content shown on the display 115 in FIG. 5A is sub-divided into the plurality of content elements 122. Each content element 122 represents information about a particular salesperson in the embodiment shown. As an example, the content element 122 for "Jane Smith" in FIG. 5A includes the following: a picture of "Jane Smith," a total amount in sales for "Jane Smith" ($150,000), and the number of deals "Jane Smith" has closed (12). In contrast, the content element 122 for "Steve Connor" includes the following: a picture of "Steve Connor," his total amount in sales ($100,340), and the number of deals he has closed (8). Other salespeople are also represented by respective content elements 122.

In some embodiments, the content elements 122 are saved in separate files, file folders, file paths, etc. on the content file system 120 or the external content file system 136. Thus as shown in FIG. 5A, for example, the display 115 may simultaneously display content from separate files. Also, it will be appreciated that at least one content element 122 may be assembled from sub-elements (e.g., elements that are saved in separate files, file folders, file paths, etc.).

The content elements 122 are organized in rows and columns in FIG. 5A; however, the content elements 122 may have any suitable arrangement. It will be appreciated that the content elements 122 may differ from those shown. For example, at least one content element 122 may be a graph of numerical data, an animation, a programmed feature, or other content.

Furthermore, in some embodiments, FIG. 5A may represent a first channel that is viewable on the display 115 of the TV 102. In this example, FIG. 6 illustrates a second channel that is viewable on the display 115.

The content element 122 of FIG. 6 includes a notification regarding a single salesperson. The content element 122 includes the name of the salesperson, a personalized message directed to that salesperson, and numerical sales data.

It will be appreciated that the user of the TV 102 may selectively switch between the first channel of FIG. 5A and the second channel of FIG. 6. It will also be appreciated that there may be more than two channels available on the TV 102.

In some embodiments, the TV 102 may provide an interactive experience to the user. For example, at least one content element 122 may be selectable by the user, and the TV 102 may respond to the user input by displaying additional information related to the selection. It will be assumed that the TV 102 is currently set to the first channel of FIG. 5A. Next, the user may select one of the content elements 122 using a selector icon 124 as shown in FIG. 5B. Specifically, the content element 122 of "Jessie Lane" is selected. This causes a window 125 to appear that displays additional content sub-elements 127. In the embodiment shown, for example, the window 125 overlays some of the previously shown content elements 122. In other embodiments, the window 125 fills the screen and overlays all of the previously shown content elements 122. Accordingly, the system 100 allows the user to access a wide variety of content.

Figure 7:
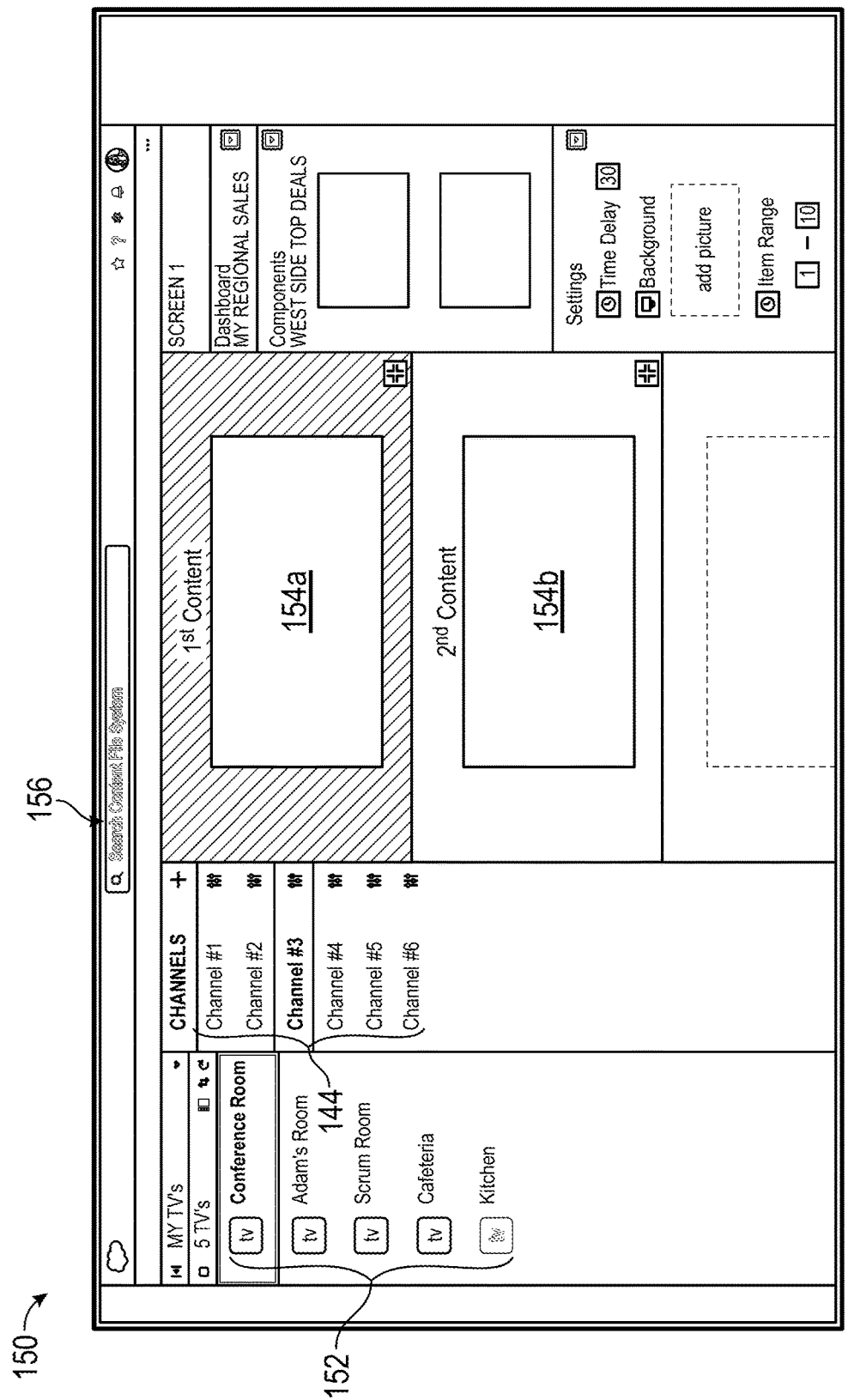
FIG. 7 is an exemplary embodiment of a graphic user interface (GUI) for customizing channels and/or content for a terminal device within the system of FIG. 1.

FIG. 7 illustrates an example GUI 150 that may be used for customizing the first and/or second channel configurations 133*a*, 133*b* of FIGS. 2A-2C. The GUI 150 may be provided on the first TV 102, the second TV 103, and/or the customizing terminal 107. The GUI 150 may be used to process user commands, communicate with the server 105, and for customizing the first and second channel configurations 133*a*, 133*b*.

The GUI 150 may include a list of TVs 152 that are available to be customized. In the illustrated embodiment, there are the "Conference Room" TV, the "Adam's Room" TV, the "Scrum Room" TV, the "Cafeteria" TV, and the "Kitchen" TV available for customization. The "Conference Room" TV is selected in FIG. 7, and the available channels for that TV (i.e., the channel data 144 for the "Conference Room" TV) is shown. Channel #3 is selected. The GUI 150 additionally includes windows 154*a*, 154*b* for assigning content elements 122 to Channel 3. The GUI 150 may further include a search engine 156 for searching for content elements 122 that are stored within the content file system 120 and/or the external file source 121. Also, the GUI 150 may include options for changing the appearance and/or other characteristics of the channels.

Figure 3:
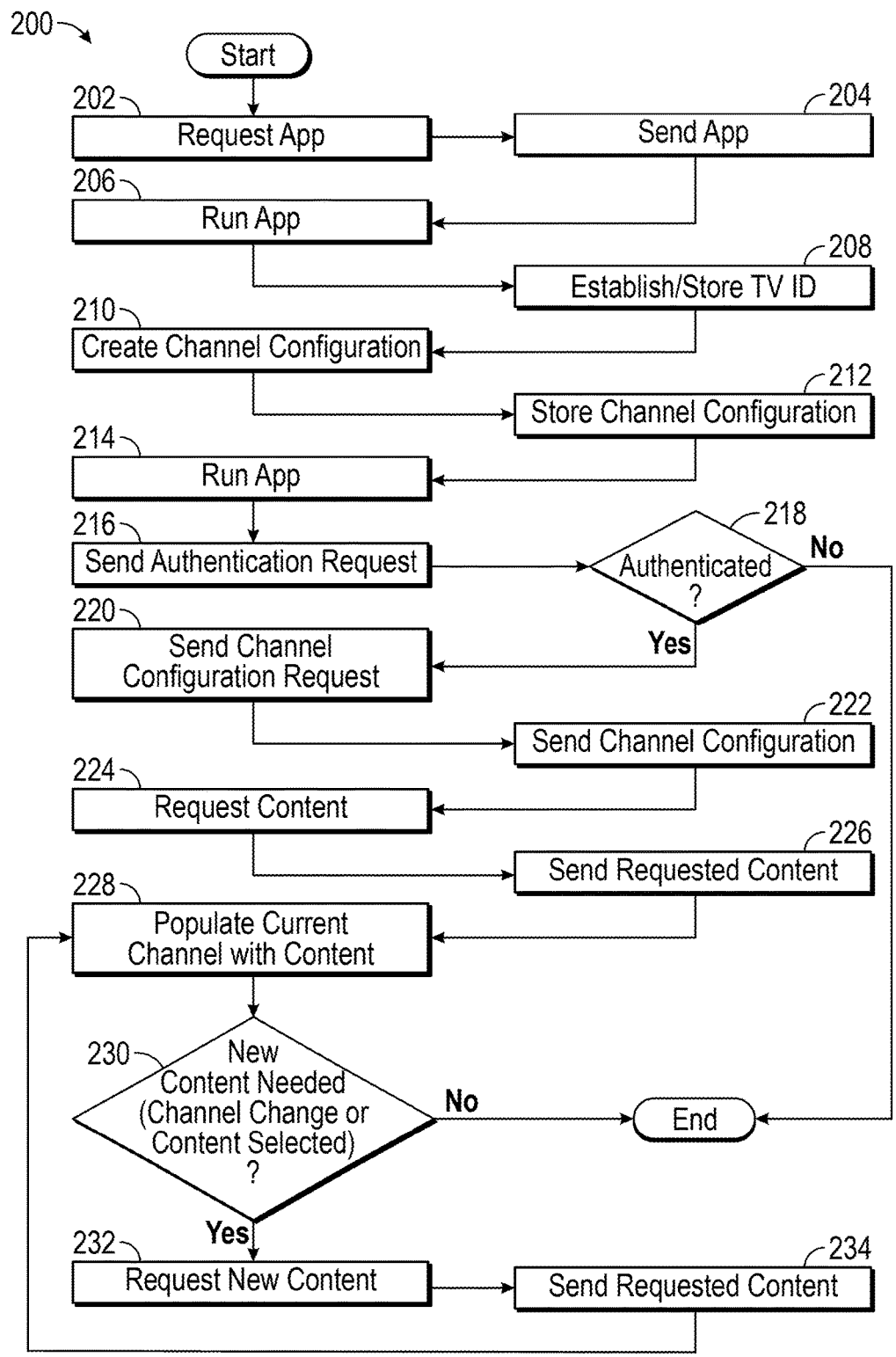
FIG. 3 is a flow chart that illustrates an exemplary embodiment of a method of operating the content delivery system of FIG. 1.

Embodiments of a method 200 of operating the system 100 will now be discussed with reference to FIG. 3. For purposes of discussion, it will be assumed that the first TV 102 is being used and that the first TV 102 has no customized channel configuration at the outset. FIG. 3 is generally arranged such that tasks performed by or associated with the first TV 102 appear on the left-hand side, and tasks performed by or associated with the server 105 appear on the right-hand side.

The various tasks performed in connection with the method 200 may be performed by software, hardware, firmware, or any combination thereof. For illustrative purposes, the following description of the method 200 may refer to elements mentioned above in connection with FIGS. 1, 2A-2C, 5A, 5B, 6, and 7. In practice, portions of the method 200 may be performed by different elements of the described system. It should be appreciated that the method 200 may include any number of additional or alternative tasks, the tasks shown in FIG. 3 need not be performed in the illustrated order, and the method 200 may be incorporated into a more comprehensive procedure or process having additional functionality not described in detail herein. Moreover, one or more of the tasks shown in FIG. 3 could be omitted from an embodiment of the method 200 as long as the intended overall functionality remains intact.

As shown, the method 200 may begin at 202, wherein a request for the application 114 is sent from the TV 102 to the server 105. In response, the server 105 may obtain a copy of the application 114 from the memory element 119 and may send back the application 114 to the TV 102. Then, at 206, the TV 102 stores the application 114 in the memory element 112, and runs the application 114. Next, at 208, the server 105 may establish a device ID 139a for the TV 102 and store the device ID 139a in the device ID file system 134 as shown, for example, in FIGS. 2A-2C. It will be appreciated that the device ID 139a may be established with a user-selected password or other type of security protocol.

Next, at 210, the TV 102 may be used to create the customized channel configuration 133a. As discussed above the TV 102 may provide a GUI 150 (e.g., that of FIG. 7), which allows the user to select the number of channels that will be available as well as the content that will be included on those channels. Once the channel configuration 133a is created, the server 105 may store the channel configuration 133a in the channel configuration file system 135 (e.g., as shown in FIG. 2B).

At this point, the TV 102 is able to operate and switch between the different customized channels that have been included on the customized channel configuration 133a. Thus, when the TV 102 re-launches the application 114 at 214, the TV 102 may send an authentication request 216 to the server 105. Next, at 218, the server 105 determines the authenticity of the TV 102. In some embodiments, the server 105 attempts to match the device ID 139a to the TV 102 in a known manner. If the server 105 is unable to authenticate the TV 102, the method 200 may terminate. However, if the server 105 authenticates the TV 102, the method 200 may continue at 220.

At 220, the TV 102 may send to the server 105 a request for the channel configuration 133a, which was customized at 210 and stored at 212. In response, the server 105 obtain and send back the channel configuration 133a. Once received, the TV 102 may temporarily save the channel configuration 133a in its memory element 112.

Figure 4:
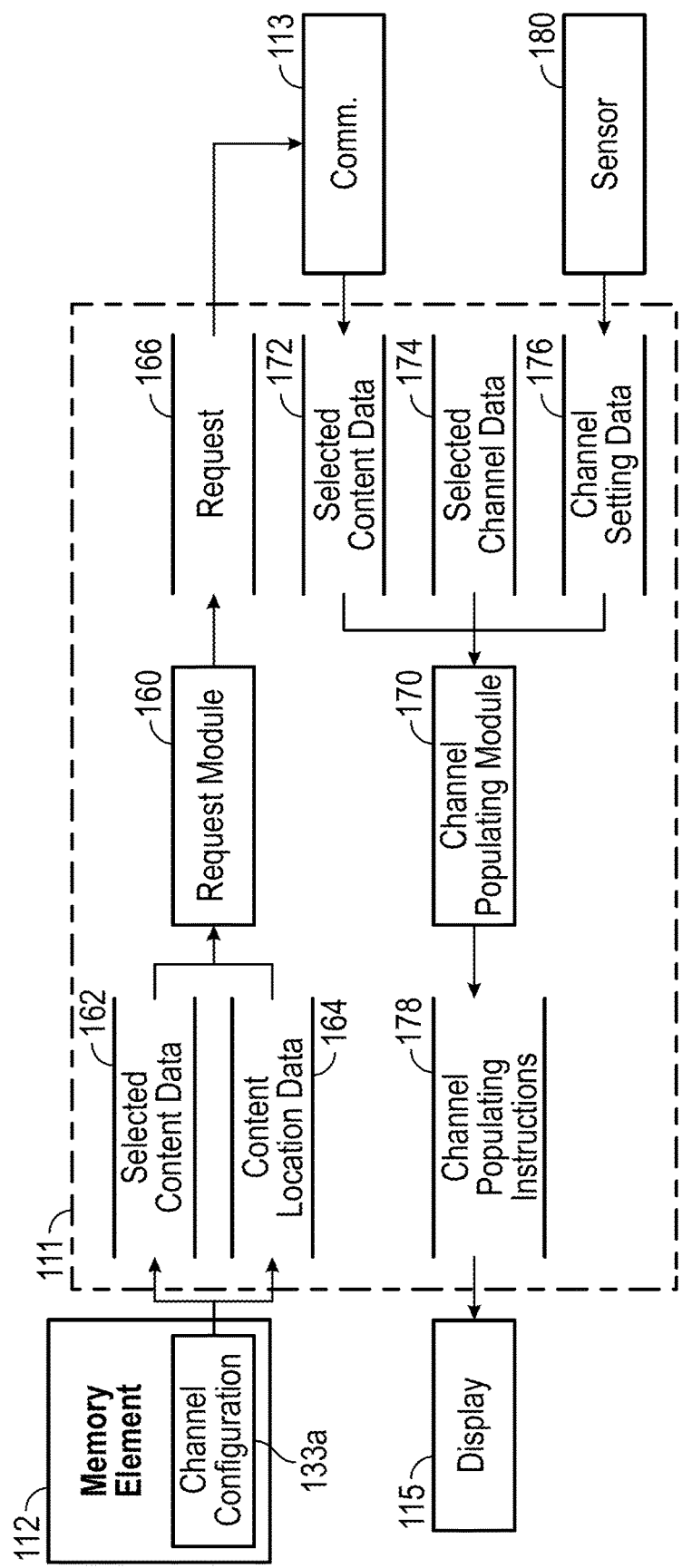
FIG. 4 is a simplified schematic representation of data flow for a terminal device of the content delivery system of FIG. 1.

Next, at 224, the TV 102 may send a request for the content elements 122 that are listed in the channel configuration 133a. Specifically, as shown in FIG. 4, a request module 160 of the processor 111 of the TV 102 may receive selected content data 162 from the channel configuration 133a. The request module 160 may also receive content location data 164 from the channel configuration 133a. The content data 162 may correspond with the selected content elements 122, and the content location data 164 may correspond with the file locations included in the metadata 148. With the selected content data 162 and the content location data 164, the request module 160 may generate a request 166 for content and send the request to the server 105 via the communications device 113. In other words, the request 166 may identify to the server 105 where to find specific content elements 122. Accordingly, at 226 of the method 200 of FIG. 3, the server 105 may locate and send back the requested content elements 122 to the TV 102. The requested content elements 122 sent from the server 105 may be received as selected content data 172.

The method 200 may continue at 228, wherein the TV 102 may populate the channels of the TV 102. In some embodiments illustrated in FIG. 4, a channel populating module 170 of the processor 111 may receive the selected content data 172. The channel populating module 170 may also receive the selected channel data 174 from the channel configuration 133a. Also, channel setting data 176 (i.e., the current channel setting of the TV 102) may be detected by a sensor 180. The channel populating module 170 may generate channel populating instructions 178 from the selected content data 172, the selected channel data 174, and the channel setting data 176. The channel populating instructions 178 may instruct the display 115 which content elements 122 to display, how to display them, etc.

The method 200 may continue at 230, wherein the processor 111 determines whether new content is needed. In some embodiments, the decision at 230 is answered affirmatively if the user changes the channel using the input device 110. If so, then at 232, the TV 102 may request new content for the new channel. The request 166 may be formed similar to 224 and as shown in FIG. 4. Next, at 234, the server 105 may reply with the content requested at 232. Then, the method 200 may loop back to 228, wherein the TV 102 populates the channel with the new content elements 122. Thus, the method 200 may loop between steps 228, 230, 232, and 234 continuously until step 230 is answered negatively or until the TV 102 is turned off.

In some embodiments of step 230, the TV 102 may automatically change between two of more of the channels indicated in the channel configuration 133a. In other words, the TV 102 may have an "autoplay" function in which the TV 102 automatically cycles through multiple channels. In some embodiments, the channels may be changed automatically at predetermined time intervals. When the channel automatically changes, the TV 102 requests the new content at 232, the server 105 may send the requested content at 234, and the method 200 may loop back to 228.

Additionally, in some embodiments, new content is needed (i.e., decision block 230 answered affirmatively) when the user selects a content element 122. For example, if the user selects a content element 122 as shown in FIG. 5B, then the method 200 continues to 232 and the user-selected content sub-elements 127 are requested. Next, at 234, the server 105 replies with the requested sub-elements 127. The method 200 then loops back to 228 and so on as discussed above.

It will be appreciated that the method 200 may allow the TVs 102, 103, 104 to request specific content elements 122 from the server 105, and the server 105 may retrieve those content elements 122 according to the request. In some embodiments, the server 105 may provide a content element 122 without being prompted by the TV 102, 103, 104. For example, the system 100 and method 200 may be configured so that the server 105 provides push-notifications to one or more of the TVs 102, 103, 104. The notifications illustrated in FIG. 6 may be provided in this manner in some embodiments.

Accordingly, the system 100 and method 200 of the present disclosure is useful and convenient for providing customized content to specific ones of the TVs 102, 103, 104. Moreover, the content output at the TVs 102, 103, 104 may be saved centrally at the server 105, such that the content is stored securely. Also, this content may be updated easily at this central location so that the content is accurate and up-to-date.

In the example illustrated in FIGS. 5A, 5B, and 6, the system 100 and method 200 are used to distribute sales and sales-related data for salespeople. The system 100 and method 200 may be useful in this scenario. Content elements 122 may be used to compile and compare sales data for multiple salespeople. A particular group of salespeople may be users of the first TV 102, for example. As such, sales data for that group of salespeople can be tailored and customized, spurring healthy competition, providing clear and accurate information that is relevant to the group.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method of operating a content delivery system that includes a plurality of terminal devices and a server, the server having access to a memory element, the method comprising:
storing, within the memory element, a plurality of channel configurations dictating a customized set of channels available to display on particular ones of the plurality of terminal devices;
authenticating one terminal device of the plurality of terminal devices with the server;
receiving, by the server from the one terminal device, a first request for one of the plurality of channel configurations, the one of the plurality of channel configurations associated with the one terminal device, the one of the plurality of channel configurations dictating a customized channel for the one terminal device, the customized channel being one of a plurality of selectable channels for display on the one terminal device;
sending, by the server to the one terminal device, the one of the plurality of channel configurations in response to the first request, including sending a collection of metadata for a first content element and a second content element to be simultaneously displayed on the customized channel, the metadata indicating a first storage location of the first content element within the memory element, the metadata indicating a second storage location of the second content element within the memory element;
receiving, by the server, at least one second request for content from the one terminal device, the at least one second request corresponding to the one of the plurality of channel configurations and indicating the first storage location and the second storage location;
retrieving, by the server, the first content element and the second content element according to first storage location and the second storage location indicated in the at least one second request;
sending, by the server to the terminal device in response to the at least one second request, the first content element and the second content element for populating the customized channel by the one terminal device according to the one of the plurality of channel configurations; and
displaying by the one terminal device, the first content element and the second content element simultaneously on the customized channel according to the one of the plurality of channel configurations.

2. The method of claim 1,
further comprising detecting, by a processor of the one terminal device, a current channel setting of the one terminal device; and
wherein displaying the first content element and the second content element includes displaying the first and second content element according to the detected current channel setting.

3. The method of claim 2, wherein the one of the plurality of channel configurations dictates a first customized channel and a second customized channel that are selectable for display on the one terminal device, wherein displaying the first content element and the second content element includes displaying the first and second content elements on the first customized channel, and further comprising:
detecting, by the processor of the one terminal device, a change from the first customized channel to a second customized channel;
sending, by the one terminal device to the server, an additional second request for content according to the one of the plurality of channel configurations, the metadata indicating an additional storage location of an additional content element within the memory element;
retrieving, by the server, the additional content element from the additional storage location; and
displaying, by the one terminal device, the additional content element on the second customized channel.

4. The method of claim 1, further comprising:
detecting, by the processor of the one terminal device, a selection of the first content element;
sending, by the one terminal device to the server, a request for a content sub-element according to one of the plurality of channel configurations, the content sub-element being related to the selected first content element, the metadata indicating an additional storage location of the content sub-element within the memory element;
retrieving, by the server, the content sub-element from the additional storage location; and
displaying, by the one terminal device on the customized channel, the content sub-element.

5. The method of claim 1, further comprising:
receiving by the server, a request for an app from the one terminal device;
sending, by the server to the one terminal device, the app in response to the request for the app; and
running, by the one terminal device, the app on an operating system of the one terminal device;
wherein the authenticating of the one terminal device occurs via the app;

further comprising sending from the one terminal device to the server via the app, the first request; and further comprising sending from the one terminal device to the server via the app, the at least one second request.

6. The method of claim 1, further comprising:

sending, by the server, a channel template to at least one of the one terminal device and a customizing device; and receiving, by the server from the at least one of the one terminal device and the customizing device, a change request to the channel template to define the one of the plurality of channel configurations.

7. The method of claim 1, wherein the one terminal device is a first terminal device;

wherein the content delivery system includes a second terminal device; and further comprising:

storing, within the memory element, a first channel configuration that has been customized for the first terminal device, the first channel configuration including first metadata indicating the first storage location and the second storage location;

storing, within the memory element, a second channel configuration that has been customized for the second terminal device, the second channel configuration including second metadata indicating a third storage location for a third content element;

receiving, by the server, a first content request for the first and second content elements from the first terminal device according to the first metadata;

receiving, by the server, a second content request for the third content element from the second terminal device according to the second metadata;

retrieving, by the server, the first and second content elements according to the first metadata in response to the first content request;

retrieving, by the server, the third content element according to the second metadata in response to the second content request;

sending, by the server to the first terminal device, the first and second content elements for populating the customized channel; and sending, by the server to the second terminal device, the third content element for populating a second customized channel by the second terminal device according to the second customized channel listing.

8. A video delivery server system for a plurality of terminal devices comprising:

a processor device; and a memory element communicatively coupled to the processor device, the memory element having computer executable instructions stored therein and configurable to be executed by the processor device to cause the video delivery server system to perform a method comprising:

storing, within the memory element, a plurality of channel configurations dictating a customized set of channels available to display on particular ones of the plurality of terminal devices;

authenticating one terminal device of the plurality of terminal devices;

receiving a first request for one of the plurality of channel configurations, the one of the plurality of channel configurations associated with the one terminal device, the one of the plurality of channel configurations dictating a customized channel for the one terminal device, the customized channel being one of a plurality of selectable channels for display on the one terminal device;

sending, to the one terminal device, the one of the plurality of channel configurations in response to the first request, including sending a collection of metadata for a first content element and a second content element to be simultaneously displayed on the customized channel, the metadata indicating a first storage location of the first content element within the memory element, the metadata indicating a second storage location of the second content element within the memory element;

receiving, at least one second request for content from the one terminal device, the at least one second request corresponding to the one of the plurality of channel configurations, and indicating the first storage location and the second storage location;

retrieving the first content element and the second content element according to first storage location and the second storage location indicated in the at least one second request;

sending, to the terminal device in response to the at least one second request, the first content element and the second content element for the one terminal device to simultaneously display on the customized channel according to the one of the plurality of channel configurations.

9. The system of claim 8, wherein the method further comprises receiving a request for an app from the one terminal device and sending, to the one terminal device, the app in response to the request for the app;

wherein the app is configured for authenticating the one terminal device, for generating the first request, and for generating the second request.

10. The system of claim 8, wherein the method further comprises:

sending a channel template to at least one of the one terminal device and a customizing device; and receiving, from the at least one of the one terminal device and the customizing device, a change request to the channel template to change the one of the plurality of channel configurations; and updating, according to the change request, the one of the plurality of channel configurations, including changing a visual layout of the first content element and the second content element for display on the customized channel by the one terminal device.

11. A television (TV) system comprising:

a plurality of TVs including a first TV that includes a TV processor, a TV memory element, and a display;

a server that includes a server processor and a server memory element, the server memory element having a plurality of content elements stored thereon, the server memory element including a plurality of channel configurations dictating a customized set of channels available for display on particular ones of the plurality of TVs, the plurality of channel configurations dictating predetermined ones of the plurality of content elements to be displayed on particular ones of the plurality of channels for the different ones of the plurality of TVs;

wherein the plurality of channel configurations includes a first channel configuration for the first TV, the display of the first TV configured to selectively switch between display of the first channel and display of the second channel;

wherein the first channel configuration dictates that, when the first channel is displayed, a first content element and a second content element are to be displayed simultaneously;

wherein the first channel configuration dictates that, when the second channel is displayed, a third content element is to be displayed;

wherein the first channel configuration indicates a storage location within the server memory element of the first, second, and third content elements;

wherein the first TV is configured to generate a first request for the first channel configuration;

wherein the first TV is configured to receive the first channel configuration from the server in response to the first request;

wherein the first TV is configured to generate at least one second request for the first content element and the second content element, the at least one second request including the storage location within the server memory element of the first and second content elements; and wherein the first TV is configured receive the first and second content elements from the server in response to the at least one second request; and wherein the display of the first TV is configured to display the first channel, including simultaneous display of the first content element and the second content element.

12. The TV system of claim 11, wherein the first TV is configured to send an additional request for the third content element that includes the storage location within the server memory element of the third content element;

wherein the server is configured to retrieve the third content element in response to the additional request; and wherein the display of the first TV is configured to display the third content element on the second channel.

13. The TV system of claim 11, wherein at least one of the plurality of content elements is user-selectable;

wherein the first TV is configured to send to the server a request for a content sub-element according to the first channel configuration, the content sub-element being related to the selected content element;

wherein the server is configured to retrieve the content sub-element from the server memory element and send the content sub-element in response to the request for the content sub-element; and wherein the display of the first TV is configured to display the content sub-element.

14. The TV system of claim 11, wherein the plurality of TVs includes a second TV;

wherein the server memory element includes a second channel configuration that dictates a second set of channels available for display on the second TV, the second channel configuration dictating a second collection of content elements to be displayed on the second set of channels;

wherein the second TV is configured to request the second channel configuration from the server and is configured to receive the second channel configuration from the server in response to the request;

wherein the second TV is configured to request from the server the second collection of content elements according to the second channel configuration; and wherein the second TV is configured receive the second collection of content elements and display at least some of the second collection of content elements.

* * * * *